United States Patent [19]
Kunz

[11] 3,967,781
[45] July 6, 1976

[54] ELECTRICALLY OPERATED EXPANSION VALVE FOR REFRIGERATION CONTROL

[75] Inventor: Bernard L. Kunz, Collinsville, Ill.

[73] Assignee: Emerson Electric Co., St. Louis, Mo.

[22] Filed: Feb. 12, 1975

[21] Appl. No.: 549,455

[52] U.S. Cl. ............................. 236/68 R; 60/529; 219/511; 137/543.23; 236/92 B; 236/101 B
[51] Int. Cl.² ...................................... G05D 23/24
[58] Field of Search .......... 236/68 R, 101 R, 101 B, 236/92 B; 251/11; 137/508, 543.23; 6/529; 219/511

[56] References Cited
UNITED STATES PATENTS

| | | | |
|---|---|---|---|
| 2,788,639 | 4/1957 | Kraft | 236/68 R X |
| 3,121,315 | 2/1964 | Matthies | 236/68 R X |
| 3,211,414 | 10/1965 | Webb | 236/68 R X |
| 3,335,997 | 8/1967 | Sherwood | 251/11 |

*Primary Examiner*—William E. Wayner
*Assistant Examiner*—William E. Tapolcai, Jr.
*Attorney, Agent, or Firm*—Polster and Polster

[57] ABSTRACT

An expansion valve for a refrigeration system is provided in which the flow through the expansion valve is controlled electrically. The preferred valve embodiment utilizes a straight line configuration in that a valve body is mounted within a suitable shell. The valve body has an axial opening through it, and one end of the valve body defines an expansion port. A valve pin is movably mounted between a first position closing the expansion port and a second position opening the expansion port. Electrically energizable means are mounted to the valve body. The electrically energizable means include thermostatic expansion means operatively connected to the valve pin. The thermostatic expansion means expand axially in response to temperature change, which movement actuates valve pin operation, between closed and opened positions.

12 Claims, 4 Drawing Figures

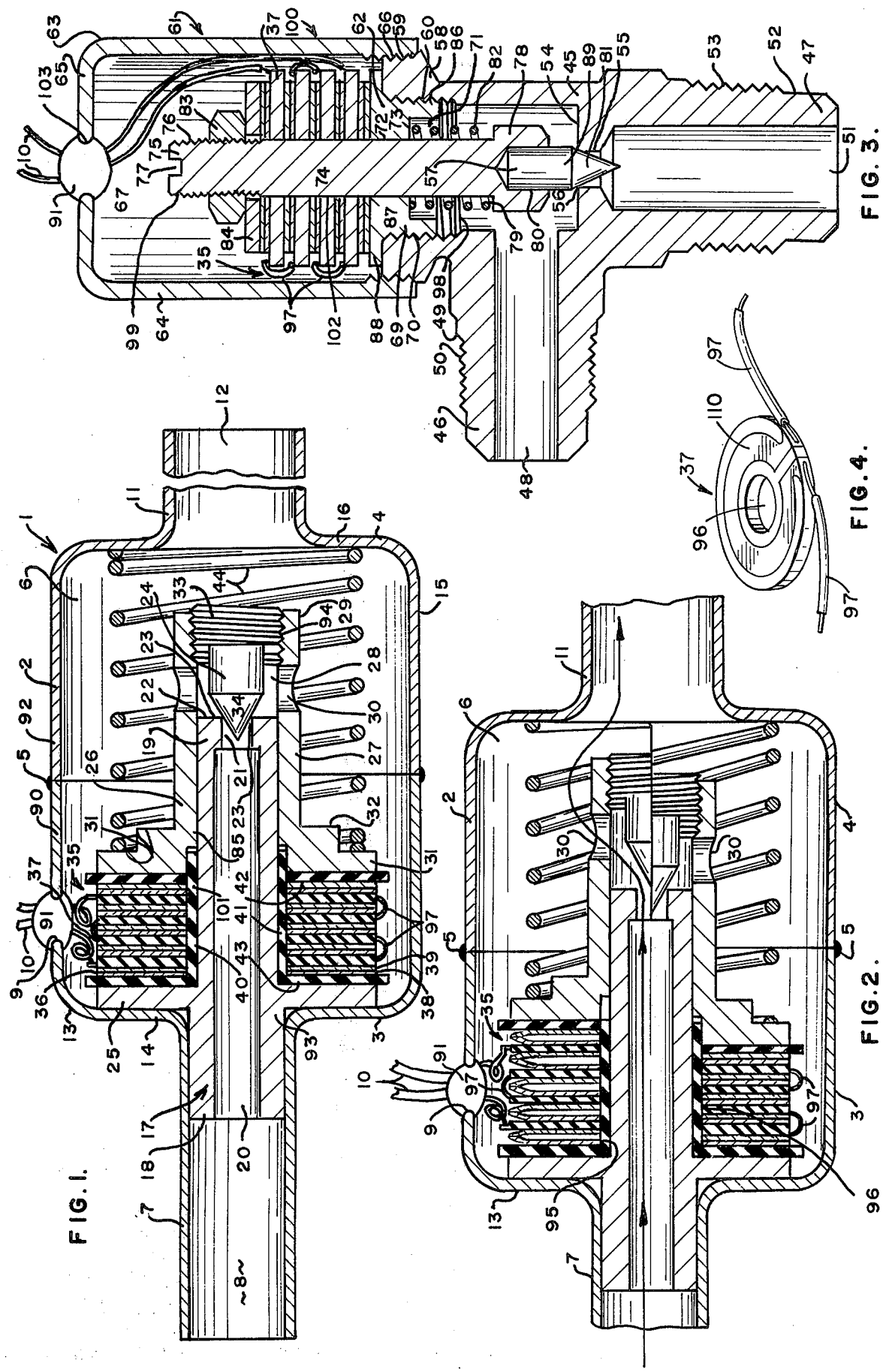

ELECTRICALLY OPERATED EXPANSION VALVE FOR REFRIGERATION CONTROL

BACKGROUND OF THE INVENTION

This invention relates to expansion valves for refrigeration systems, and in particular, to an electrically operated expansion valve. While the invention is described in particular detail with respect to expansion valve applications, those skilled in the art will appreciate the wider scope of the invention described hereinafter.

Refrigeration systems generally include an evaporator, a compressor, and a condenser. Refrigerant vapors drawn from the evaporator by the compressor are forced into the condenser, where the vapor liquifies. The liquid refrigerant then is returned to the evaporator through an expansion valve. The expansion valve converts the refrigerant from a high pressure liquid to a low pressure gas by passing the refrigerant through a restriction in the valve. Control of refrigerant input to the evaporator can be maintained by inserting a valve member in the restriction of the expansion valve, and adjusting the valve member position in response to a particular external condition.

The majority of prior art expansion valves have been thermostatic responsive devices. Commonly, these prior art devices utilize a diaphragm responsive valve for modulating the refrigerant passing through the restriction. That is to say, the valve includes a valve pin operatively connected to a flexible diaphragm. A spring is biased between the valve and the diaphragm on one side of the diaphragm so as to force the valve pin toward a closed portion of the valve, while the opposite side of the diaphragm is operatively connected to a temperature sensing, pressure generating means. The temperature sensing means conventionally is charged with a gas. The gas expands as temperature increases, thereby raising the pressure on one side of the diaphragm, moving the diaphragm and consequently the valve pin, in a direction so as to open the expansion port or restriction.

Thermostatic controlled expansion valves, while working well for their intended purposes, are relatively complicated in their manufacture in that the temperature sensing means and the valve must be charged and hermetically sealed during valve manufacture.

Electrically controlled expansion valves also are known in the art. In general, an electrically controlled valve should be able to control the refrigeration system more precisely because of its theorically faster response time. More precise control, in turn, should improve the efficiency of the refrigeration system. Presently known electrically controlled valves, however, have not exhibited the faster response times supposedly inherent in this type of valve. That is to say, the refrigerant fluids passing through prior art valve constructions have affected valve operation to such an extent that the response times of the electrically controlled valves are not as good as one would expect, other factors being equal. Consequently, prior art designs often employ a combination diaphragm and electrical actuator system.

The invention disclosed hereinafter overcomes prior art deficiencies by utilizing, in the preferred embodiment, a straight line construction having an electrically operated thermostatic means operatively connected directly to the valve pin of the valve. The thermostatic means includes a plurality of bi-metalic discs alternately placed between and adjacent to a plurality of heater elements. The heater elements include a resistive member which is capable of radiating heat directly to the adjacent bi-metal discs, thereby providing improved heat transfer and quicker response times than other known designs.

One of the objects of this invention is to provide an improved electrically operated expansion valve.

Another object of this invention is to provide an expansion valve having a straight line construction.

Yet another object of this invention is to provide an electrically operated valve having an electrically generated thermostatic means comprising a plurality of bi-metallic discs and a plurality of heater elements alternately arranged in the valve structure.

Still another object of this invention is to provide an expansion valve, the operation of which is dependent solely on an electrical input.

Other objects of this invention will be apparent to those skilled in the art in light of the following description and accompanying drawings.

SUMMARY OF THE INVENTION

In accordance with this invention, generally stated, an electrically operated expansion valve is provided including a shell defining a chamber. A valve body is mounted in the chamber. The valve body has an axial opening through it which has a reduced diameter along one end of it so as to delimit an expansion port. A valve pin is movably mounted between a first position closing the expansion port, and at least one second position opening the expansion port. A plurality of heating elements are arranged alternately with a plurality of bimetallic discs within the chamber defined by the shell so that the application of electrical energy to the heating elements causes the discs to expand axially. The heater-disc combination is operatively connected to the valve pin so that axial movement of the bimetallic discs causes the valve pin to move toward its second position, opening the expansion port.

BRIEF DESCRIPTION OF THE DRAWINGS

In the drawings,

FIG. 1 is a sectional view, partly broken away, of one illustrative embodiment of electrically operated valve of this invention;

FIG. 2 is a sectional view of the valve shown in FIG. 1, illustrating the difference between the closed and opened position of the valve;

FIG. 3 is a sectional view of a second illustrative embodiment of electrically operated valve of this invention, and FIG. 4 is a view in perspective of a heater element compatible with the valve of this invention.

DESCRIPTION OF THE PREFERRED EMBODIMENT

Referring now to FIG. 1, reference numeral 1 indicates one illustrative embodiment of electrically operated valve of this invention. The valve 1 includes an outer shell 2 conventionally constructed from sheet metal. The shell 2, in FIGS. 1 and 2, is defined by a first section 3 and a second section 4, which are joined, for example, by welding or brazing as generally indicated at 5, to form the shell 2. When so formed, the shell 2 defines a chamber 6.

Section 3 of the shell 2 has a connector 7 integrally formed with it. The connector 7 has an axial opening through it, which communicates with the chamber 6 and defines an inlet 8 for the valve 1. While the connector 7 is described as integrally formed with the section 2, the connector 7 may be manufactured separately and later interconnected with the section 3, if desired. Section 3 includes a side wall 13 having a portion 14 extending radially outwardly from the connector 7, and a longitudinally extending portion 90. Side wall 13 has an opening 9 through it, along the portion 90, which communicates with the chamber 6. Opening 9 permits access to the chamber 6 for electrical conductors indicated generally by the numeral 10. A suitable seal 91 is provided for insulating the conductors 10 from the shell 2 and for sealing the valve 1 against fluid flow through the opening 9.

Section 4 of the shell 2 has a connector 11 integrally formed with it. The connector 11 has an axial opening through it which communicates with the chamber 6 and defines an outlet 12 of the valve 1. Again, connector 11 may be manufactured separately and later interconnected to the section 4, if desired. The section 4 includes a side wall 15 having a portion 16 extending radially outwardly from the connector 11, and a longitudinally extending portion 92 which meets the portion 90 of the section 3 at its terminating end. The sections 3 and 4 generally are similar to one another, except that the outlet 12 may be substantially larger than the inlet 8. The connectors 7 and 11 function to permit the interconnection of the valve 1 to a particular application.

A valve body 17 is mounted within the chamber 6 and includes a generally cylindrical part 93 having a first end 18 and a second end 19. The part 93 of valve body 17 has an axial opening 20 extending through it, between the end 18 and a restriction 21 formed at the end 19. Restriction 21 is constructed merely by closing the end 19 to a predetermined diameter smaller than the diameter of the opening 20. A face 22 of the end 19 defines a valve seat 23 for a valve pin 24. The valve pin 24 is later described in detail. The valve body 17 also has an annular flange 25 integrally formed with the part 93. The flange 25 extends radially outwardly from the part 93, and is positioned inboard of the end 18 so that a predetermined length of the part 93, along the end 18 side, may be inserted within the inlet 8 of the section 3 in a tight, friction fit. When so positioned, the flange 25 abuts portion 14 of the side wall 13 of the section 3.

A valve member 26 includes a substantially cylindrical section 27 which has an axial opening 28 through it. A first end 29 of the section 27 is threaded along a portion of a wall 94. Wall 94 delimits the opening 28, and the threaded portion permits the intermounting of the section 27 with the valve pin 24. A pair of openings 30 extend through the section 27, and are positioned near the end 29, inboard of the threaded portion of the wall 94. The openings 30 communicate with the opening 28. An end 85 of the section 27 has an annular shoulder 31 extending outwardly from a generally enlarged hub part 32. Both the hub 32 and shoulder 31 are integrally formed with the section 27.

The valve pin 24 includes a threaded portion 33 having a tapered pin 34 attached to it. The pin 34 and the portion 33 may be integrally formed with one another, or they may be constructed separately and later interconnected by any convenient method. The threads of the portion 33 are designed to mesh with the threads along the end 29 of the valve member 26 and to permit adjustment of the valve pin 24 with respect to the seat 23 of the valve body 17, as later described in detail.

An electrically operable means 35 is mounted to the valve body 17, adjacent the annular flange 25. The electrically operable means 35 includes a plurality of bimetallic discs 36 interleaved between a plurality of heater elements 37.

Each of the bimetallic discs 36 are annular in plan, having a central opening 95 through them. The bimetallic discs 36 conventionally comprise a first metal disc 38 and a second metal disc 39 having substantially different coefficients of expansion, which are bonded along their mating surfaces by any convenient method.

The heater elements 37 also are annular in plan, and may comprise any of a variety of commercially available devices. For example, heater elements 37 may comprise a ceramic support having an electrical resistor attached to it. The resistor may be and preferably is a resistance heater 110 symmetrically disposed along at least one and preferably each axially outboard facing surface of the annular ceramic support, about a central opening 96 in the ceramic support. The openings 95 and 96 are congruent with one another, and function to permit the insertion of the heater elements 37 and bimetallic discs 36 over the valve body 17 and an insulating means 40. The heater elements 37 are serially connected to one another and to the electrical connections 10 by a plurality of jumper wires 97.

Insulating means 40 is defined by a sleeve 41 and a washer 42. The sleeve 41 includes an annular base 43 which abuts the flange 25 and an axially extending part 101 which surrounds the outer surface of the valve body 17. The washer 42 is annular in plan, having a central opening in it to permit its insertion over the part 101 of the sleeve 41. The insulating means 40 may be constructed from any convenient material. For example, a phenolic resin works well.

A spring 44 is biased between the portion 16 of the section 4, and the shoulder 31 of the valve member 26. Spring 44 is intended to bias the valve pin 24 against the seat 23. The spring 44 preferably is a conventional coil compression spring, the spring constant of which is chosen so that a predetermined spring force must be overcome before the valve pin 24 is allowed to move away from the seat 23.

It may be observed, in FIG. 1, that the chain of bimetallic discs 36 and the heater elements 37 of the electrically operable means 35 are in abutting relationship with the washer 42 which in turn has the shoulder 31 transmitting the force of the spring 44 through it to the means 35. The valve pin 24 may be adjusted along the portion 33-end 29 threads to ensure that the spring 44 drives the valve member 26 to its leftmost portion, referenced to FIGS. 1 and 2, while the valve pin 24 simultaneously seats against the seat 23.

Operation of the valve 1 is best understood by referring to FIG. 2. As there shown, fluid flow through the valve 1 will be restricted as long as the force exerted by the spring 44 is not overcome. The spring force is overcome by the action of electrically energizable means 35. Thus, the leads 10 may be electrically connected to some form of temperature sensor, a room thermostat, for example, which activates the means 35 whenever a predetermined condition is sensed. Application of electrical energy to the means 35 causes the heater elements 37 to radiate thermoenergy as the electrical energy dissipates in elements 37. That is to say, the amount of voltage applied to the heater elements 37 will increase or decrease the heat supplied to discs 36. The alternating relationship of the bimetallic discs 36 and heater elements 37 ensures that excellent heat transfer occurs between those parts. Since the discs 36 comprise two different metal discs 38 and 39, expansion of the metal used for the discs occurs at different rates. Consequently, the discs tend to become "bow" shaped with respect to one another. That is, the discs will expand axially, causing the shoulder 31 to move rightwardly, referenced to FIGS. 1 and 2. This action also causes the valve member 26 to move rightwardly against the bias of the spring 44, so that the valve pin 24 moves away from the seat 23. Fluid then is free to flow through the restriction 21 and the openings 30 to the outlet 12 of the valve 1. FIG. 2 is a divided view which graphically illustrates the opened and closed positions of the valve 1, which, as indicated, is controlled by the axial expansion and contraction of the bimetallic discs 36. It thus may be observed that varying the voltage applied to the heater elements 37 will control the opening of valve 1 so that valve 1 operation will be proportional to the applied voltage.

A second embodiment of valve of my invention is illustrated in FIG. 3, and is indicated generally by the reference numeral 100. The function and operation of the valves 1 and 100 are similar, and like reference numerals are used to indicate like parts, where appropriate. As shown in FIG. 3, the valve 100 has a body section 45 which is substantially L-shaped in cross section, having a first leg 46 and a second leg 47. The leg 46 has an axial opening through it which defines an inlet 48 for the valve 100. The leg 46 generally is a cylindrical section having an outer wall 49. Wall 49 includes a threaded portion 50, which is utilized to interconnect the valve 100 to a particular application.

The leg 47 also has an axial opening through it which defines an outlet 51 for the valve 100. The leg 47 generally is a cylindrical section having an outer wall 52. Wall 52 includes a threaded portion 53 also utilized to interconnect the valve 100 to a particular application. An internal wall 54 of the body section 45 defines a restriction 55. The restriction 55 has a function similar to the restriction 21 described above, and it connects the inlet 48 to the outlet 51. Wall 54 also defines a seat 56 for a valve pin 57. The legs 46 and 47 generally are similar to one another, except that the outlet 51 may be substantially larger than the inlet 48.

Body section 45 includes a hub 58 which is integrally formed with and extends upwardly from the leg 46. Hub 58 defines a central opening 98 which is axially aligned with the restriction 55 and outlet 51. The hub 58 also has an outer threaded wall 59 and an internally threaded wall 60, which are utilized to mount a shell 61 and a fitting 62, respectively, to the hub 58.

Shell 61 is conventional, and comprises a generally cylindrical body 63 having a side wall 64 and a top wall 65. The side wall 64 has an internally threaded face 66 designed to mate with the outer threaded wall 59 of the hub 58, permitting the intermounting of the shell to the body section 45. When so intermounted, the shell 61 and body section 45 define a cavity 67.

The top 65 of shell 61 has an opening 103 through it, which gives access to the cavity 67 for the electrical conductors 10.

The fitting 62 includes a cylindrical body part 69 defined by an outer side wall 70 having complimentary threads formed in it for mounting the fitting 62 along the threads of the inner wall 60 of the hub 58, within the opening 98. Body part 69 has a first end 86 having a central recess 71 formed in it, and a second end 87 having an outwardly extending lip 88 integrally formed with it. The lip 88 abuts the upper end of the hub 58 in the intermounted position of the fitting 62. Body part 69 also has an opening 72 in it, which communicates with the cavity 67 and the recess 71. Recess 71 has a bottom wall 73 about the opening 72. Opening 72 is sized to receive a valve stem 74 in a slip fit.

The valve stem 74 is an elongated structure having a first end 75 and a second end 78. The end 75 of stem 74 has a slot 77 formed in it. The slot 77 is useful in adjusting the valve stem 74 position with respect to the seat 56, as later described. The end 78 includes an annular shoulder 79 which acts as a stop for one end of a spring 82. End 78 also has a central recess 80 formed in it. The recess 80 is sized to receive the valve pin 57. Valve pin 57 includes a body portion 89 having a first end insertable in the recess 80 in a tight friction fit. Additional methods for joining the valve pin 57 to the valve stem 74 may be utilized, if desired. The second end of the body portion 89 defines a tapered part 81 adopted to seat against the restriction 55, thereby closing it to fluid flow.

The spring 82 is biased between the shoulder 79 of valve stem 74 and the wall 73 of the recess 71 in the fitting 62 so that it exerts a force on the valve pin 57 tending to drive the part 81 against the seat 56. Spring 82 is a conventional coil compression spring, and is not described in detail. Its function is similar to that described for the spring 44.

The valve stem 74 has an outer wall 99 having a threaded portion 76 and a generally smooth portion 102. Electrically operable means 35 is inserted over the valve stem 74 in a manner similar to its insertion over the valve body 17 in the embodiment of FIG. 1. One of the bimetallic discs 36 abuts the lip 88 of the fitting 62, and another one of the discs 36 abuts a washer 84. Washer 84 is conventional and may comprise any of a variety of washers available commercially. A lock nut 83 is mounted over the valve stem 74. Lock nut 83 is conventional and includes a central threaded opening which intermeshes with the threaded portion 76 of the valve stem 74. The end of the lock nut 83 permits the position of the valve stem 74 to be adjusted so that the spring 82 drives the valve pin 57 to its downward-most position, referenced to FIG. 3, while the pin 57 simultaneously seats against the seat 56. Again, the chain of bimetallic discs 36 and heater elements 37 of the electrically energizable means 35 are in abutting relation with one another and with the washer 84. Consequently, axial expansion movement of the bimetallic discs 36 will act against the bias force of the spring 82.

Operation of the valve 100 is substantially similar to that described for the valve 1 in that application of electrical energy to the electrically energizable means 35 causes the discs 38 and 39 to expand, which expansion causes the valve stem 74 to move upwardly, referenced to FIG. 3, and opens the restriction 55. Once again, the use of alternately placed bimetallic discs and heater elements substantially increases the response time of the valve.

From the foregoing, it may be seen that this invention is one well adapted to attain all the ends and objects herein set forth, together with other advantages which are obvious and which are inherent to the structure.

Numerous variations, within the scope of the appended claims, will be apparent to those skilled in the art in light of the foregoing description and accompanying drawings. Thus, the silhouette of the shell 2 or shell 61 may vary in other embodiments of this invention. While particular materials were illustratively described as preferred, other materials for various components of the valve of this invention may be utilized, if desired. The number of bimetallic discs 36 or heater elements 37 used in conjunction with the electrically energizable means 35 may vary in embodiments of this invention. These variations are merely illustrative.

Having thus described the invention, what is claimed and desired to be secured by Letters Patent is:

1. An electrically operated valve, comprising:
   a shell, said shell defining a chamber having an inlet side and an outlet side;
   a valve body mounted in said shell, said valve body having a first end, a second end, and an opening from and between said first and said second ends, said second end having a valve seat formed in it, said valve seat being positioned in said chamber near said outlet side;
   electrically energizable means mounted to said valve body, said electrically energizable means including heater means and expansion means responsive to a temperature change in said heater means, said heater means comprising a plurality of ceramic supports, each of said supports having a first face and a second face, said supports also having an axial opening through them, and a resistance heater disposed along at least one of said first and said second faces about said axial opening of each of said supports, said axial opening permitting mounting of said heater means on said valve body, said expansion means moving longitudinally in response to said temperature change;
   valve means movably mounted in said chamber between at least a closed position and an open position, said valve means being operatively connected to said electrically energizable means, said valve means being movable in response to the longitudinal movement of said expansion means; and
   means for biasing said valve means towards said closed position, said biasing means comprising a spring mounted in said chamber between said valve means and said shell.

2. The valve of claim 1 wherein said expansion means comprises a plurality of disc pairs, each of said pairs including first and second metallic discs having different coefficients of expansion, each of said discs further having a central opening through them for mounting said disc pairs on said valve body, individual ones of said heater means and individual ones of said disc pairs being interleaved with respect to one another on said valve body.

3. The valve of claim 2 wherein said valve means comprises a cylindrical body having a first end and a second end, said first end having an annular flange formed in it, said annular flange having a first face abutting said expanding means, and a second face seating said spring, said second end having a valve pin mounted therein, said valve pin being adjustably mounted to said cylindrical body.

4. The valve of claim 3 wherein said first end of said valve body has an annular flange extending outwardly from it, and spaced inboard of said first end, said annular flange adapted to abut said shell when said valve body is positioned in said chamber.

5. The valve of claim 4 further characterized by insulating means mounted on said valve body, between said valve body and said electrically energizable means.

6. An electrically operated valve, comprising:
   a shell having a longitudinal axis, said shell defining a chamber having an inlet side and an outlet side along said axis;
   a valve body having a first end and a second end, said valve body having a central opening therethrough between said first and said second ends, said second end having a valve seat formed in it, said valve body being mounted in said chamber such that said central opening is coincident with said longitudinal axis;
   means for generating a temperature change mounted to said valve body, said temperature generating means including a plurality of heater elements, each of said heater elements comprising a support having a first face and a second face, and an electrical resistor device attached to at least one of said faces, said support having a central opening through it for permitting mounting of said heater element to said valve body;
   means for sensing a temperature change, said temperature change sensing means comprising a plurality of expandable elements mounted to said valve body, individual ones of said plurality of expandable elements of said temperature change sensing means comprising first and second metal discs having substantially different coefficients of expansion, each of said discs having a central opening through them for permitting mounting of said discs on said valve body, individual ones of said heater elements and individual ones of said expandable elements being alternately placed on said valve body in abuttment with one another, said expandable elements moving longitudinally in response to changes in temperature;
   valve means movably mounted in said chamber for movement between at least a closed position where said valve means abuts said valve seat, and an open position where said valve means is spaced from said valve seat, movement of said valve means being responsive to longitudinal movement of said temperature change sensing means; and
   means for biasing said valve means towards its closed position.

7. The valve of claim 6 wherein said biasing means comprises a spring mounted in said chamber between said valve means and said shell.

8. The valve of claim 6 wherein said valve means comprises a cylindrical body having a first end and a second end, said first end having an annular flange formed in it, said annular flange having a first face operatively abutting one of the plurality of expandable elements of said temperature change sensing means, and a second face seating said spring, said second end of said cylindrical body having a valve pin adjustably mounted therein.

9. The valve of claim 8 further characterized by insulating means interposed between one of the plurality of expandable elements of said temperature change sensing means and the first face of said annular flange.

10. An electrically operated valve, comprising:
    a valve body, said valve body having an opening through it between a first end and a second end of said body, said valve body having a restriction formed along said opening between said first and said second ends;

valve means movably mounted between at least a first position closing said restriction, and a second position opening said restriction;

means for biasing said valve means towards said closed position;

means for generating a temperature change mounted to said valve, said temperature change generating means comprising at least one heater element, said heater element comprising a support having a first outboard surface and a second outboard surface, said support having an axial opening through it, and a resistance heater attached to each of said outboard faces of said support; and means for sensing a temperature change operatively connected to said temperature change generating means and said valve means, said temperature change sensing means comprising a plurality of expandable elements, each of said expandable elements including a pair of metal discs, each of said discs of said disc pair having substantially different coefficients of expansion, said disc pair having an axial opening through it, said heater element and pairs of said discs being interleafed with one another in a disc/heater/disc relationship, said expandable elements moving longitudinally in response to a change in temperature, movement of said expandable elements in one direction acting to move said valve toward said open position.

11. The valve of claim 10 wherein said temperature change generating means and said temperature sensing means are mounted to said valve means.

12. An electrically operated valve, comprising:

a valve body, said valve body having an opening through it between a first end and a second end of said body, said valve body having a restriction formed along said opening between said first and said second ends;

valve means movably mounted between a first position closing said restriction and a second position opening said restriction;

means for biasing said valve means towards said closed position;

means for generating a temperature change mounted to said valve, said temperature change generating means including a plurality of heater elements, each of said heater elements comprising a support having a first face and a second face, and an electrical heater device attached to at least one of said faces, said support having an axial opening through it;

means for sensing a temperature change operatively connected to said temperature change generating means, said temperature change sensing means comprising a plurality of expandable elements, each of said expandable elements including a pair of discs, each of said discs of said disc pair having substantially different coefficients of expansion, said disc pair having an axial opening through it, said heater elements and pairs of said discs being interleafed with one another, said expandable elements moving longitudinally in response to a change in temperature, movement of said expandable elements in one direction acting to move said valve toward said open position.

* * * * *